UNITED STATES PATENT OFFICE.

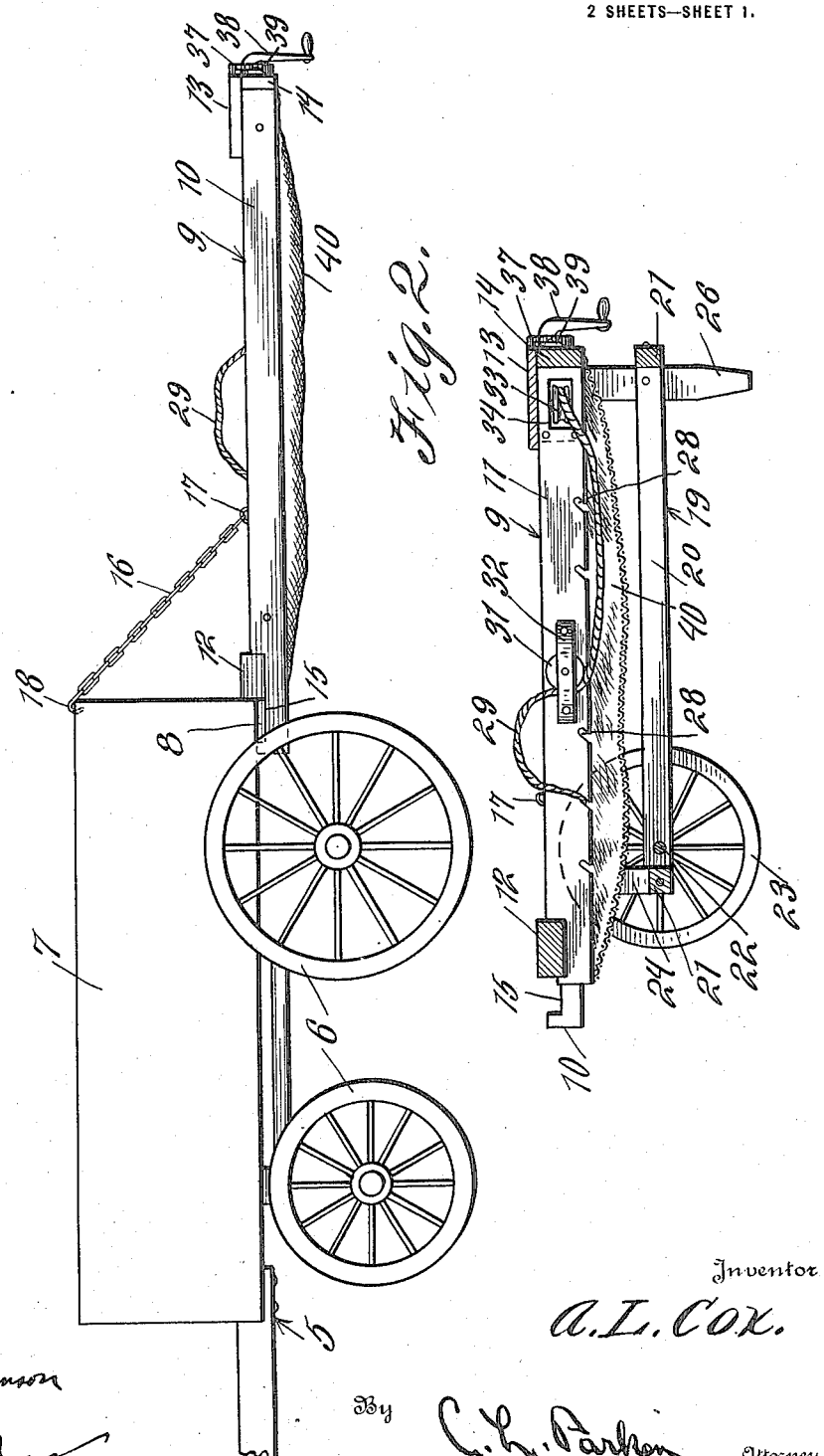

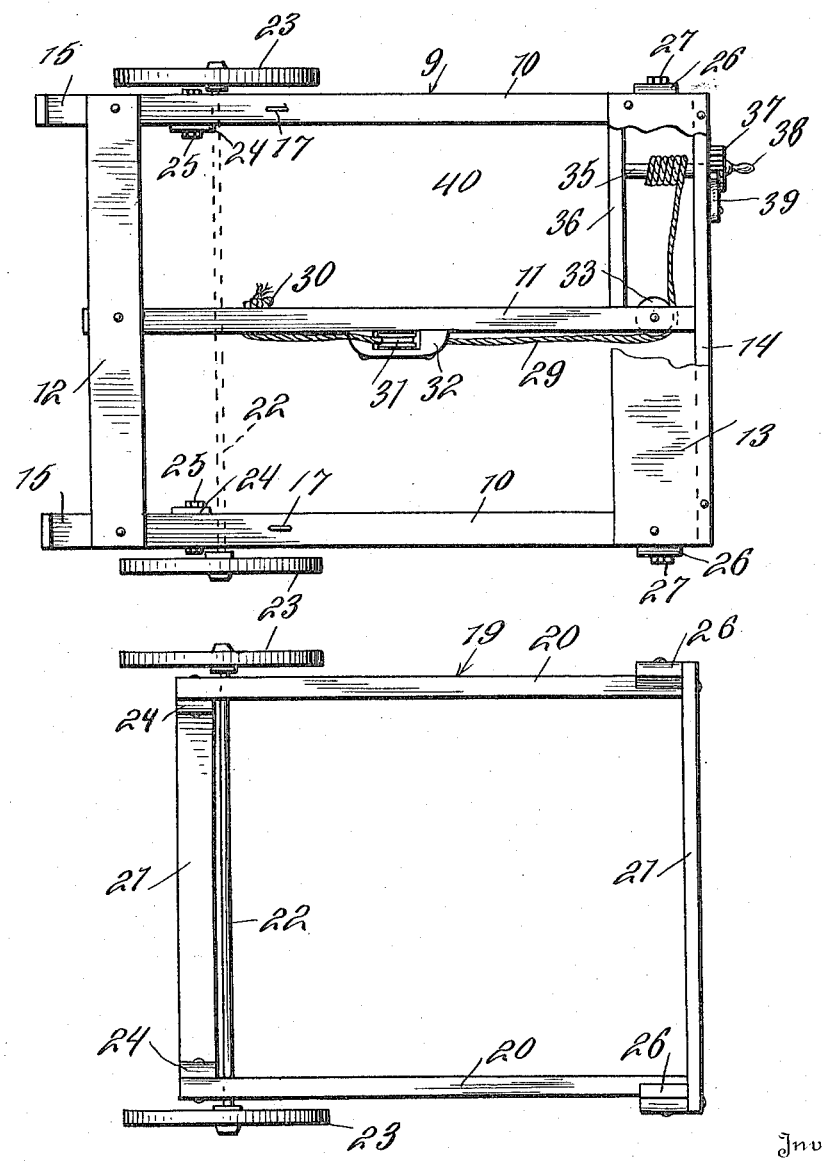

ALVIN L. COX, OF ELIZABETHTOWN, KENTUCKY.

CORN-SHOCK HARVESTER.

1,162,981. Specification of Letters Patent. Patented Dec. 7, 1915.

Application filed January 2, 1915. Serial No. 175.

*To all whom it may concern:*

Be it known that I, ALVIN L. COX, a citizen of the United States, residing at Elizabethtown, in the county of Hardin and State of Kentucky, have invented certain new and useful Improvements in Corn-Shock Harvesters, of which the following is a specification.

My invention relates to improvements in apparatus for gathering shock corn and tying the fodder or stalks or both, into bundles.

An important object of the invention is to provide apparatus of the above mentioned character, which is simple in construction, inexpensive to manufacture, and convenient in use.

Other objects and advantages of the invention will be apparent during the course of the following description.

In the accompanying drawings forming a part of this specification and in which like numerals are employed to designate like parts throughout the same, Figure 1 is a side elevation of apparatus embodying my invention, showing the same attached to a wagon body, with the wheeled supporting frame removed, Fig. 2 is a central longitudinal sectional view through the apparatus, Fig. 3 is a plan view thereof, and, Fig. 4 is a plan view of the wheeled frame removed.

In the drawings, wherein for the purpose of illustration is shown a preferred embodiment of my invention, the numeral 5 designates a wagon of any well known or preferred type, embodying wheels 6, supporting a wagon body 7. Rigidly attached to the rear projecting end of the wagon body and upon the lower side of its bottom is a transverse attaching beam 8, for a purpose to be described.

My apparatus comprises an upper tray or frame, designated as a whole by the numeral 9. As more clearly shown in Figs. 2 and 3, the tray or frame embodies longitudinal beams 10 and 11, connected by transverse end strips 12, 13, and 14, as shown. The outer longitudinal beams 10 are provided at their forward ends outwardly of and adjacent the transverse strip 12 with upper recesses or notches 15, adapted to receive the transverse attaching beam 8, as more clearly illustrated in Fig. 1. The transverse strip 12 projects upwardly beyond the longitudinal beams and recesses or notches 15 in the tops thereof, for a substantial distance.

Connected with the outer longitudinal beams 10 are preferably flexible elements, shown as chains 16, secured thereto by staples 17 or the like. At their free ends, the chains 16 carry hooks 18, for detachable engagement with the top of the rear end of the body 7. As clearly shown in Fig. 1, these chains, when in use, are inclined, and coöperate with the transverse attaching bar 8 for securely detachably holding the tray or frame 9, to the wagon body. I prefer to connect the tray or frame 9 with the rear end of the wagon body but it is to be understood that the invention is not restricted to this manner of connection, as satisfactory results are obtainable by securing the tray or frame to the side of the wagon body.

In order that the tray or frame 9 may be readily portable to be carried over or about the field for engagement with the wagon body 7, or to be used independently of the wagon body, the same is detachably mounted upon a lower preferably rectangular wheeled frame 19, embodying longitudinal beams 20, rigidly connected by transverse beams 21. An axle 22 is carried by the forward ends of the longitudinal beams 20 and wheels 23 are arranged upon the axle. Rigidly secured to the forward ends of the beams 20 and preferably arranged upon the inner sides thereof are upstanding connecting members or standards 24, adapted to be detachably connected by bolts 25 or the like with the longitudinal beams 10 of the upper tray or frame 9. Rigidly connected with the rear ends of the beams 20 are upright feet or standards 26, extending upwardly and downwardly beyond the same for a substantial distance, with their upper ends adapted to be detachably connected with the beams 10 by bolts 27 or the like. In Fig. 1, the upper frame or tray 9 is shown secured to the body 7 with the wheeled frame removed, while in Fig. 2, the tray 9 is supported by the wheeled frame, and may be readily pushed or pulled over or about the field or ground, as may be desired.

As more clearly shown in Figs. 2 and 3, the inner longitudinal beam 11 is provided upon its lower longitudinal edge with preferably inclined depending openings or notches 28, for detachably receiving the end of a binding or compressing flexible element 29, carrying an enlargement or knot 30, as shown. The flexible element 29 is adapted to engage with a grooved pulley 31, secured to the side of the beam 11, by a bracket 32. The flexible element 29 further engages a horizontally rotating grooved pulley 33, rotatably mounted within an opening 34, formed in the rear end of the beam 11. The flexible element 29 is secured to a windlass or spool 35, journaled through the transverse strip 14 and a strip 36. The windlass or spool 35 extends exteriorly of the strip 14, and has a ratchet wheel 37, rigidly secured thereto, carrying a crank 38, which turns the same. A pawl 39 is pivoted to the strip 14 in proximity to the ratchet wheel 37 to engage therewith to prevent improper unwinding of the flexible element 29. The bottom of the upper frame or tray 9 is preferably covered or closed by a section of fabric 40, secured to the same. This fabric may be duck, canvas, or the like and serves to prevent the fodder or stalks or both, from passing through the tray.

In use, the tray or frame 9 may be secured to the body 7 as illustrated in Fig. 1, and will be moved with the wagon from one shock to the other. The operator takes the shock of corn or a part thereof and places the same upon the tray or upper frame 9. He snaps or shucks the corn from the stalks and throws the corn into the wagon body. The fodder or stalks or both, are arranged in a suitably large bundle and the free or enlarged end 30 of the flexible element is passed upwardly about the bundle which engages the upper edge of the beam 11. The enlarged end of the element 29 is thus passed around the upper side of the bundle and is inserted into the proper opening or notches 28. This having been done, the crank 38 is turned, to rotate the windlass or spool 35, which winds up the flexible element 29. This flexible element will exert suitable pressure upon the bundle to contract the same so that a tying element or wire may be passed thereabout, subsequent to which the bundle may be released from the tray. The apparatus may be used independently of the wagon, and when thus employed the same is arranged upon the wheeled frame 19 and is pushed or pulled along the field to the desired positions.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described the invention, I claim:—

1. In apparatus of the character described, the combination with a tray embodying a longitudinal element having spaced notches, a flexible member adapted to be passed into a selected notch and having an enlargement, winding mechanism connected with the flexible element and carried by the tray, and a wheeled support for the tray.

2. In apparatus of the character described, a tray embodying outer longitudinal beams and an inner longitudinal beam arranged between the outer longitudinal beams and provided with notches formed upon its lower edge, a bottom connected with the frame and arranged therebelow, a pulley connected with the side of the inner longitudinal beam, a flexible element adapted for insertion within a selected one of the notches and having an enlargement to prevent it from being withdrawn therefrom and passed about the pulley, and winding mechanism connected with the end of the tray and having the flexible element attached thereto.

3. In apparatus of the character described, a tray embodying outer longitudinal beams and an inner longitudinal beam provided with longitudinally spaced notches, a bottom connected with the frame and arranged therebelow, a flexible element adapted for insertion within a selected notch and having an enlargement to prevent it being improperly withdrawn therefrom, a pulley carried by the inner beam between its ends and engaged by the flexible element, a second pulley connected with the outer end of the tray and engaged by the flexible element, and a winding element carried by the outer end of the tray and having the flexible element attached thereto.

4. In apparatus of the character described, a tray having longitudinally spaced holding devices, a flexible element adapted to have detachable engagement with a selected one of said devices, a pulley connected with the tray and engaging the flexible element, and winding means connected with the flexible element.

In testimony whereof I affix my signature in presence of two witnesses.

ALVIN L. COX.

Witnesses:
PEARL H. COX,
MAYME HOLCOMBE.

Copies of this patent may be obtained for five cents each, by addressing the "Commissioner of Patents, Washington, D. C."